United States Patent [19]

Friedrich

[11] Patent Number: 5,293,905
[45] Date of Patent: Mar. 15, 1994

[54] PIPELINE PLUG

[76] Inventor: Jaromir Friedrich, 10720-209 Street, Edmonton, Alberta, Canada, T5S 1Z8

[21] Appl. No.: 932,190

[22] Filed: Aug. 21, 1992

[51] Int. Cl.$^5$ .................................... F16L 55/10
[52] U.S. Cl. ..................................... 138/89; 138/97; 166/122; 166/135
[58] Field of Search ............... 138/89, 97; 166/122, 166/134, 135, 187, 192

[56] References Cited

U.S. PATENT DOCUMENTS

| | | | |
|---|---|---|---|
| 2,973,036 | 2/1961 | Brown | 166/122 |
| 3,181,614 | 5/1965 | Brown | 166/122 |
| 3,467,182 | 9/1969 | Kisling | 166/135 |
| 3,642,064 | 2/1972 | Rosenthal | 166/135 |
| 3,942,560 | 3/1976 | Deaver | 138/89 |
| 3,943,982 | 3/1976 | Lecordier | 138/89 |
| 3,978,678 | 9/1976 | Duncan et al. | 138/89 |
| 3,978,892 | 9/1976 | Scodino | 138/89 |
| 4,057,081 | 11/1977 | Jones | 138/97 |
| 4,077,435 | 3/1978 | Van Scoy | 138/89 |
| 4,390,043 | 6/1983 | Ward | 138/89 |
| 4,422,477 | 12/1983 | Witman et al. | 138/89 |
| 4,465,104 | 8/1984 | Wittman et al. | 138/89 |
| 4,494,584 | 1/1985 | Rognoni | 138/89 |
| 4,498,811 | 2/1985 | Fern et al. | 138/89 |
| 4,612,961 | 9/1986 | Vetter | 138/93 |
| 4,708,202 | 11/1987 | Sukup et al. | 166/122 |
| 4,804,018 | 2/1989 | Carr et al. | 138/93 |
| 4,852,391 | 8/1989 | Ruch et al. | 73/40.5 |
| 4,852,614 | 8/1989 | Johansen et al. | 138/93 |
| 4,854,384 | 8/1989 | Campbell | 166/122 |
| 4,875,615 | 10/1989 | Savard | 138/89 |
| 4,909,281 | 3/1990 | Réaux | 138/89 |
| 4,991,651 | 2/1991 | Campbell | 166/122 |
| 5,029,614 | 7/1991 | Lara et al. | 138/89 |

FOREIGN PATENT DOCUMENTS

| | | |
|---|---|---|
| 0082895 | 7/1983 | European Pat. Off. |
| 0089738 | 9/1983 | European Pat. Off. |
| 0367633 | 5/1990 | European Pat. Off. |
| 3142768 | 7/1982 | Fed. Rep. of Germany |
| 3219184 | 1/1983 | Fed. Rep. of Germany |
| 3610624 | 10/1987 | Fed. Rep. of Germany |
| 3625838 | 2/1988 | Fed. Rep. of Germany |
| 3818703 | 12/1989 | Fed. Rep. of Germany |
| WO88/10393 | 12/1988 | PCT Int'l Appl. |
| 1218238 | 3/1986 | U.S.S.R. |
| 1231309 | 5/1986 | U.S.S.R. |
| 1574974 | 6/1990 | U.S.S.R. |
| 1657835 | 6/1991 | U.S.S.R. |
| 1576356 | 10/1980 | United Kingdom |
| 2117863 | 10/1983 | United Kingdom |
| 2182113 | 5/1987 | United Kingdom |
| 2203214 | 10/1988 | United Kingdom |
| 2223290 | 4/1990 | United Kingdom |
| 2223818 | 4/1990 | United Kingdom |

*Primary Examiner*—James E. Bryant, III
*Attorney, Agent, or Firm*—Stevens, Davis, Miller & Mosher

[57] ABSTRACT

A pipeline plug is disclosed wherein the rear portion of the plug is axially movable relative to the body of the plug and is provided with pipeline engaging drag inducing members. While the plug is propelled by the pipeline fluid flow, the dragging effect maintains the rear portion at its rearmost extreme. When the plug reaches its determined position in the pipeline, the reversal of flow in the pipeline is resisted by the drag means with the resulting shift of the rear portion forwardly of the plug, triggering the locking of the plug in place and subsequent expansion of the seals of the plug, all caused solely by the pressure differential generated in the pipeline to be worked upon.

15 Claims, 7 Drawing Sheets

PIPELINE PLUG

BACKGROUND OF THE INVENTION

This invention relates to the art of pipeline pigs or pipeline packers. Pipeline pigs are used in isolating a predetermined section of a pipeline from the fluid of the pipeline in order to enable repairs, connecting or other maintenance or installation tasks which cannot be done while the medium flows through the respective pipeline.

Various types of pipeline pigs are known in the art. One of the required features of the pipelines is that they be provided with suitable gripping means which would firmly engage the inside wall of a pipeline. To this end, a number of different mechanisms is known utilizing hydraulic power combined with a toggle mechanism and many other ways of securing a firm engagement. Viewed from the standpoint of the present invention, the known pipeline pigs are of complex structure and require additional sources of power for achieving different operational states.

It is an object of the present invention to advance the art by providing a relatively simple structure of a pipeline pig which is capable of being displaced along and locked inside a pipeline solely by utilizing the flow and pressure differentials of the medium inside the pipeline.

SUMMARY OF THE INVENTION

In general terms, the invention provides a pipeline plug for use in temporarily plugging a section of a pipeline, said plug comprising, in combination:

(a) an elongated body having a front end and a rear end;
(b) front guide device and a rear guide device disposed one near each the front and rear end, respectively, for guiding the plug through a pipeline as the plug is propelled, the front end first, by fluid pressure generated by a medium flowing through the respective pipeline;
(c) a selectively generally radially expandable elastomeric sealing device provided with a seal expanding mechanism, to expand the sealing device to thus plug the respective pipeline;
(d) a selectively radially expandable locking mechanism adapted to engage, upon expansion, the inside wall of the respective pipeline to lock the body against movement relative to the pipeline;
(e) lock actuation member freely reciprocally movable along the body from a first position to a second position;
(f) said lock actuation member including a drag device comprising friction inducing section and engagement device adapted to urge said friction inducing section in contact with the inside wall of the respective pipeline;
(g) transmission mechanism operatively disposed between the friction inducing section and the locking mechanism to cause expansion of the locking mechanism when the plug is subjected to a reversed flow of the fluid in the pipeline, directed against the front end of the body.

In another aspect, the invention can also be defined, in general terms as providing a pipeline plug for use in temporarily plugging a section of a pipeline, said plug comprising, in combination:

(a) an elongated body having a front end and a rear end;
(b) front guide device and a rear guide device disposed one near each the front and rear end, respectively, for guiding the plug through a pipeline as the plug is propelled, the front end first, by fluid flowing through the pipeline;
(c) a selectively radially expandable locking mechanism adapted to engage, upon expansion, the inside wall of the respective pipeline to lock the body against movement relative to the pipeline;
(d) a selectively generally radially expandable elastomeric main seal provided with a seal expanding mechanism, to expand the sealing device to thus plug the respective pipeline;
(e) said seal expanding mechanism including a seal expansion cone mounted on said body coaxially with the main seal;
(f) said seal expansion cone and said main seal being axially displaceable relative to each other and being complementary with each other to provide for expansion of said main seal when engaged under pressure with the cone;
(g) pressure transmitting device operatively associated with the main seal and with the cone to transmit fluid pressure in the respective pipeline and acting against one end of the body, to urge said main seal and said cone to each other to thus expand said main seal, whereby the power of expansion of said main seal is derived from pressure inside the pipeline and acting against the plug.

BRIEF DESCRIPTION OF THE DRAWINGS

The invention will be described by way of preferred embodiments, with reference to the accompanying drawings. In the drawings.

DESCRIPTION OF PREFERRED EMBODIMENTS

Figure 1:
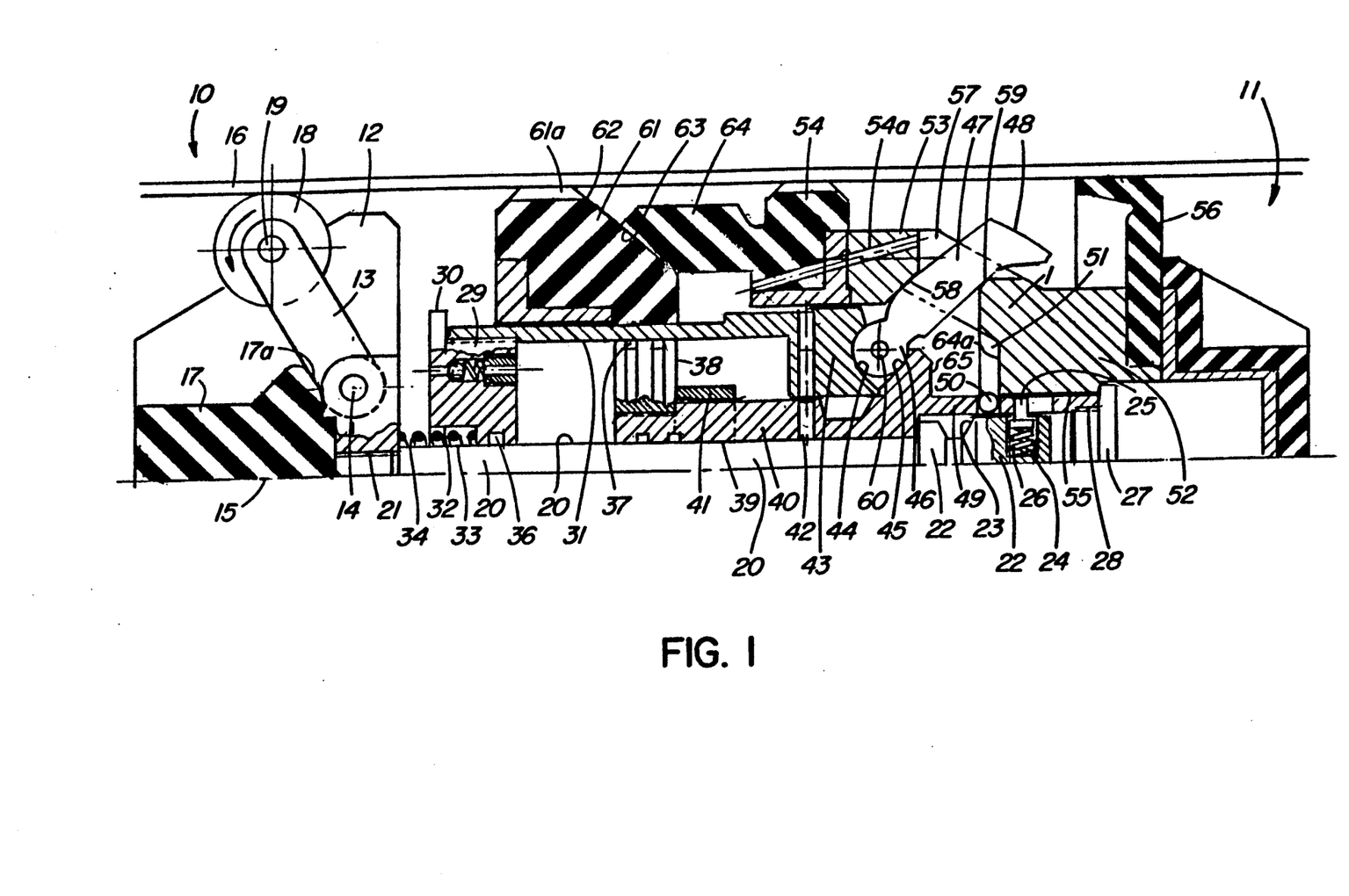
FIG. 1 is a diagrammatic longitudinal section of an upstream plug shown in a position at which it is inserted into a pipeline to be repaired and in which it is being brought to the point at which it is to be sealingly engaged with the pipeline.
Figure 2:
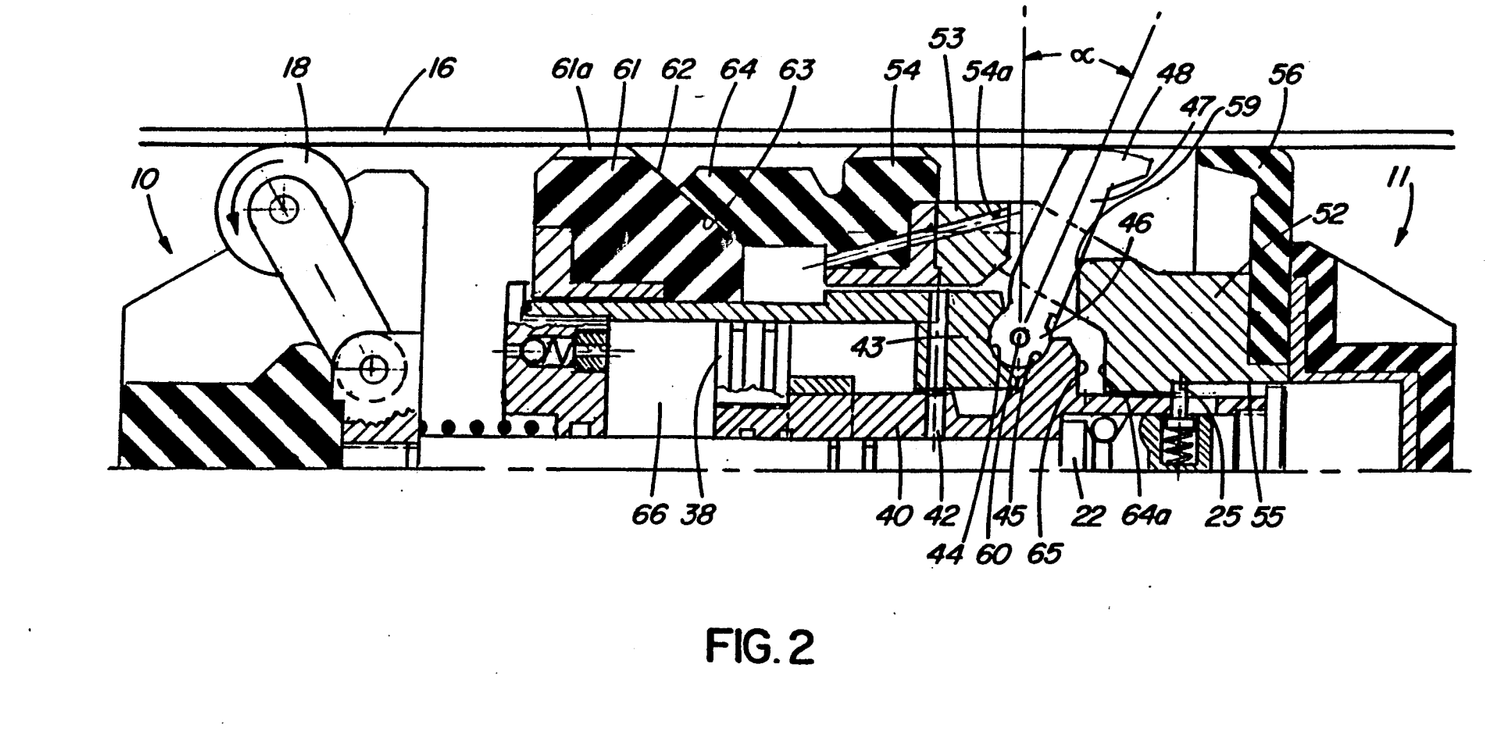
FIG. 2 is a diagrammatic representation similar to that of FIG. 1 but showing the plug at a stage at which the operation of locking the plug in place has commenced.
Figure 3:
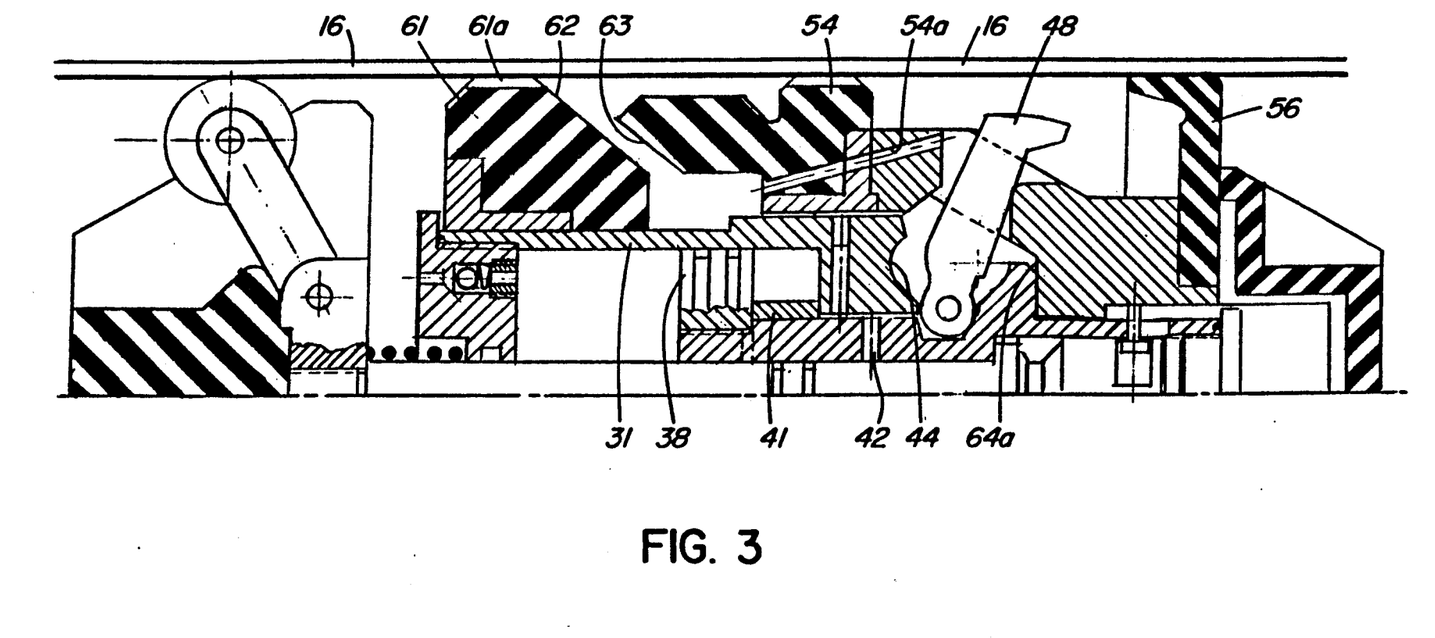
FIG. 3 shows the plug at a stage where the toggle jaws or moving struts have been released to allow passage of the plug away from the point of repair.

The plug shown in FIGS. 1-3 is a first embodiment of a plug including features of the present invention. It is a so-called upstream plug, i.e. a plug directed to isolate and become fixed at an upstream end of a pipeline section to be fixed, from the standpoint of the direction of regular flow of fluid such as oil, natural gas or the like. The regular direction of the pipeline flow in FIGS. 1-3 is from the left to the right.

The upstream plug has an upstream end 10 and a downstream end 11. It includes, at the upstream end 10, a guide support 12 which is provided, in the embodiment shown, with a series of trailing arms 13 (only one shown in each of the Figures), freely pivotable at a pivot pin 14 for a swinging movement radially away from and towards a longitudinal axis 15 of the plug, which coincides, in operation, with the axis of a pipeline 16 to be repaired. The guide support 12 is also provided with a resilient upstream bumper 17 having a conical end portion 18 in engagement with the arms 13 in order to resiliently urge the arms 13 radially outwardly.

The outer, free end of each arm 13 is provided with a unidirectional roller 18 which is maintained in contact with the pipe 16 when the device is in use. The roller 18 can freely rotate about a pivot pin 19 in a unidirectional fashion, in case of roller 18, in counter-clockwise direction. The roller 18 is blocked, for instance by a ratchet-and-pawl mechanism not shown in detail, from rotating clockwise. In general terms, the roller 18 and in particular its unidirectional rotation, presents a first embodiment of what can generally be referred to as drag device.

The central part of the support 12 is fixedly secured to an upstream end of a central rod 20, for instance by a thread 21. The rod 20 passes through the centre of the plug to the downstream end portion where it defines an enlarged head 22 defining a peripheral groove 23 of a trapezoidal cross-section as shown. Proceeding further downstream, the head defines a radially outwardly open spring well 24 which houses a sliding pin 25. The compression spring 26 in the well 24 urges the pin 25 in a radially outward direction. At the extreme downstream end of the slide rod 20, an end cup 27 is threaded in an inner thread 28 of the rod 20.

Slidably received on the rod is the inner body of the plug. It includes, at the upstream end, a cylinder lid 29 provided with a flange 30 and threaded into the upstream end of a cylinder 31. The cylinder lid 29 is provided with a centrally disposed annular recess 32 which houses the downstream end of a cylindric compression spring 33. The upstream end 34 of the spring 33 rests against the downstream directed face 35 of the guide support 12. A seal 36 sealingly engages the rod 20 to provide for free but sealing engagement between the rod 20 and the lid 29. A set of seals 37 is arranged on the outer periphery of a piston 38 and a similar set of seals 39 is disposed at the periphery of the rod 20. The seals 39 are shown in engagement with the inner passage of an extension 40 integral with the piston 38 and therefore also referred to as a "piston rod 40". A sleeve-shaped stop 41 projects rearward from the piston 38.

The piston rod 40 is fixedly secured to the cylinder 31 by a shear pin 42 so that the two parts form an integral unit. The extreme portion of the cylinder 31 at the downstream end thereof forms a bulky boss 43 provided with a concave seat 44 which co-operates with a concave seat 45 of the piston rod or extension 40 to guide a cylindric pivot head 46 of a moving strut 47 the free end of which forms a pipe engagement foot 48. The seats 44 and 45 are also referred to as "half-seats" as they are separate from each other and complement each other to form a seating for the moving strut 47.

The piston rod or extension 40 is provided with a sleeve-like, downstream extending projection 49 which is slidably disposed over the head 22, which defines an outer cylindric surface along a series of peripherally disposed recesses disposed about the periphery of the projection 49 housing each a locking ball 50 (only one recess and one ball 50 visible in FIG. 1). Each ball is loosely disposed within its generally cylindric recess and the recesses are generally equidistantly disposed about the periphery of the projection 49. The inner surfaces of the balls 50 thus rest on the cylindric surface of the head 22. The outer surfaces of the balls 50 are disposed in a peripheral groove 51 of a concavely arcuate cross-section and machined in a recess of a downstream end portion 52 of the outer body 53 provided with a sealing element 54 presenting one embodiment of what is generally referred to as "a main seal". A pressure compensating oblique passage or channel 54a extends between the rear and the front ends of the sealing element 54 as shown in FIGS. 1-3. It is noteworthy realize to realize that the upper end of the pin 25 presses against the cylindric wall of the end portion 52 and is located—at the state shown in FIG. 1—somewhat upstream of a cutout 55 in the end portion 52. The end portion 52 supports a guide seal cup 56 having a skirt like shape open towards the upstream end of the plug.

The end portion 52 and the main, central section of the outer body 53 also defines a recess 57 for each of the moving struts 47. The moving strut being pivotable about the centre of its pivot head 46, rests with its one side against a shoulder 58 and, with its other side on shoulder 59. The spacing between the shoulders is such that they control the pivoting or swinging motion of the moving strut 47 as will be described later. The shoulders 58, 59 thus present a guide for pivoting the moving struts 47. The central portion 60 of the pivot head 46 of the moving strut 47 houses a resilient ring passing through the central portions 60 of all pivot heads 46 and exerts a slight radially inward force on all pivot heads, without impairing smooth pivoting of the head 46 in the concave seats 44, 45.

Reference numeral 61 designates a seal locking cone made of an elastomer and fixedly secured to the outer wall of the cylinder 31. The cone has a number of axially oriented passages 61a disposed about its outer periphery. Its conical outer surface 62 is compatible with an inner conical surface 63 of an upstream or rear end portion 64 of the sealing element 54.

Before describing the operation of the upstream plug of the invention, it should be pointed out that the state of FIG. 1 presents the situation at which the plug is inserted into the pipeline, usually by use of a launch trap which would be located as a branch of the pipeline 16 at a remote position to the left of FIG. 1, i.e. upstream of FIG. 1.

Figure 7:
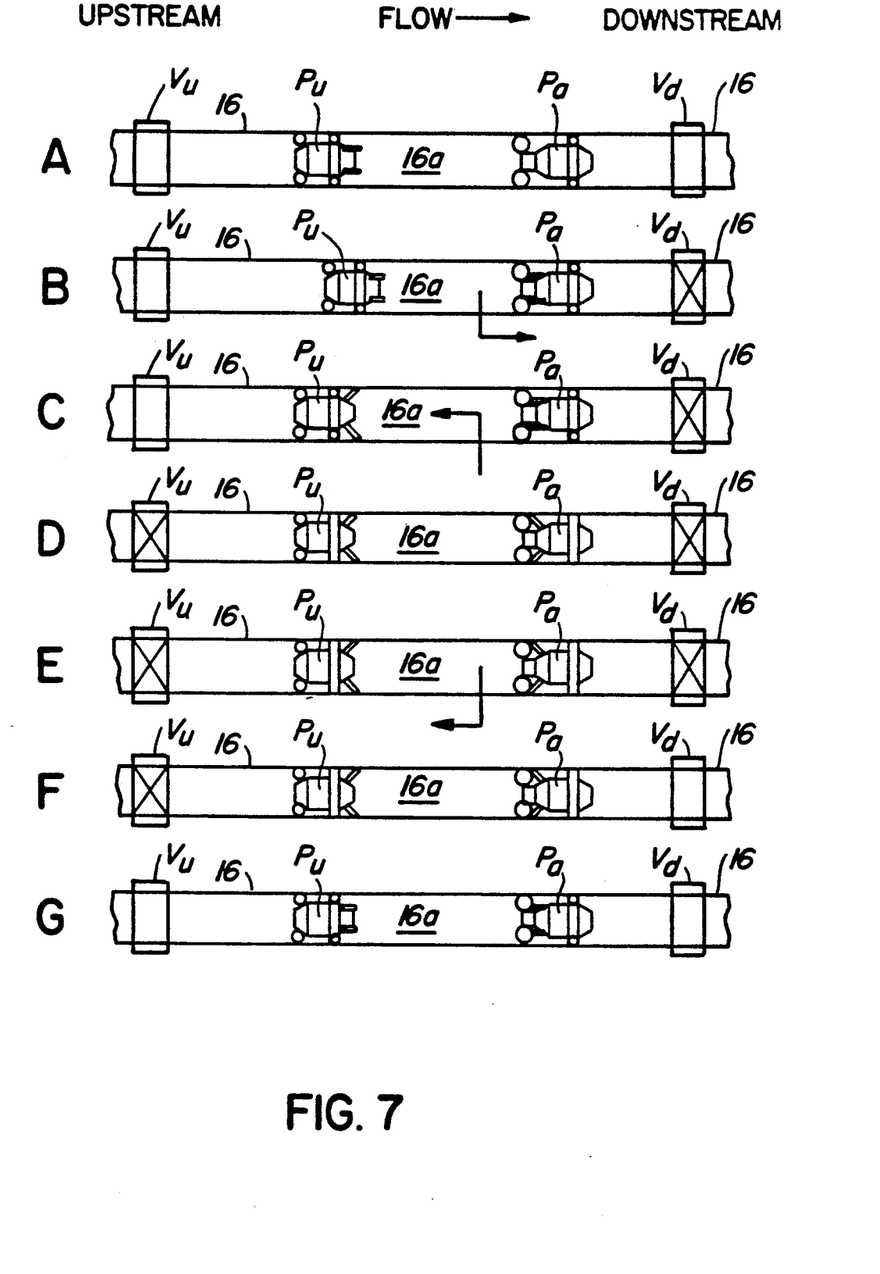
FIG. 7 is a simplified diagrammatic representation of a typical application of the plugs of the present invention.

In order to bring the plug to a desired position, pressure is applied at the upstream end 10 of the plug by opening an upstream valve $V_u$, shown only in FIG. 7 of the pipeline 16 and allowing the liquid to flow through the pipeline 16. The flow propels the plug by reaching the carrying seal cup 56, by passing the relaxed sealing element 54 through suitably located channels such as channels 61a provided at appropriate locations of the plug. Since the seal cup skirt is open in the upstream direction, the flow in the pipeline 16 generates a radially outwardly spreading force at the peripheral annular lip of the seal 56 causing appropriate sealing engagement between the seal 56 and the pipe 16. As a consequence, the whole plug moves along, from the left to the right of FIG. 1. The rear rollers 18 rotate as shown (in FIG. 1 counter-clock-wise). Their trailing arms 13 are forced radially outwardly by the conical surface 17a of the bumper 17.

The plug is now in the state shown in FIG. 1; the inner body, i.e. the cylinder, 31 is connected to the outer body, i.e. the end portion 52, the sealing element 54 etc. to form an integral unit, through the shear pin 42 and the ball coupling 50, 51. The sliding pin does not perform any locking function at this stage.

Be it assumed that an increased pressure is now applied at the downstream end 11 of the plug, for instance by injection of $N_2$ or by some other known means. Even though the pressure is applied at the opposite end of the sealing cup 56 the first change at the plug is that a force vector is developed in the upstream direction, i.e. from the front (right) to the rear (left) of the plug in FIG. 1. This gives rise to a tendency of rotating the roller 18 clock-wise, which rotation is blocked immediately. Thus, there is an instant dragging effect transmitted through the arms 13 to the guide support and thence, via the fixedly secured central rod 20, all the way to the head 22. The unidirectional rollers 18 thus present an embodiment of what is generally referred to as a "drag device," wherein the part of the surface of the rollers in contact with the inside of the pipeline 16 induces friction or a drag effect relative to pipeline 16 presenting, in general, an embodiment of a "friction inducing section" while the arms 13, the central rod 20 and the head 22 present an embodiment of a transmission mechanism.

In the second stage, the increased pressure causes the inner body (cylinder 31) and the parts integral with it through the pin 42 and ball coupling 50, to slide on the now stationary central rod 20 to the left of FIG. 1, against the pressure of the spring 33. This results in that the balls 50 eventually reach the position radially opposite to the groove 23. Since the balls are free to move in their recesses in a radially inward direction, and considering that the pressure at the front end 11 is now higher than that at the rear end 10, the balls 50 are displaced into the groove 23.

The displacement of the balls 50 into the groove 23 cancels the locking effect between the projection 49 (and thus piston rod 40) and the cylinder 31, the two being still held integral by the shear pin 42. In other words, the displacement of the outer body 52, 54, 64 relative to the inner body 31, 40 is now allowed.

With the continued sliding of the outer body 52, 54 etc. to the left of FIG. 1, an upstream face 64a of the end portion 52 eventually moves toward a downstream face 65 at the root of the extension 49 (FIG. 2). The shoulder 59 raises the arm 47 counter-clock-wise until the moving strut 47 has been raised with its foot engaging the inner wall of the pipe 16. Note that the shear pin still renders the piston rod 40 and the boss 43 integral with each other.

Consequently, the seats 44, 45 remain at a constant spacing from each other. Due to the change in the position of the moving strut 47, it is now only the shoulder 59 that supports the moving strut 47, while the opposed shoulder 58 is remote from the arm 47. This situation is shown in FIG. 2. By now, the free end of the sliding pin 25 has entered the cutout 55 in the end portion 52 to prevent return of the end portion 52 to the right of its position relative to the head 22 in order to assure firm support for the arm 47.

By the same token, the sealing element 54 is expanded as the entire element 54 slides against the surface 62 of the expanding cone 62. It should be noted that the expansion required at the sealing element 54 is relatively minor as the sealing element has a diameter only slightly smaller than the inside diameter of the pipe 16.

In the next step, the moving struts 47 have to be firmly locked with the inside wall of the pipe 16. This is accomplished by generating a pressure differential at the rear end of the plug such that the entire plug is forced to the right of FIG. 2. This is accomplished by evacuating the pipeline section past the downstream or front end 11 of the plug. The liquid pressure at the upstream end urges the entire plug to the right, eventually bringing the moving strut 47 to the off-centre (before-the-centre) locked position in which it firmly anchors the entire plug to the wall of the pipe 16. In such a locked position, the moving struts 47 are each firmly engaged against the outer body 53 at a point above the shoulder 58. The plug is firmly locked in place effectively sealing, by the expanded sealing element 54 and by the seal cup 56, the downstream space 11 where appropriate repairs can now be made while the upstream portion 10 of the pipe 16, is under pressure. It should be noted that in the locked position, the strut is not engaged by either one of the shoulders 58, 59. The length of the moving struts is selected such as to provide, in a fully locked state a before-the-centre strut angle $\alpha$ of about 3°–10°, preferably about 7°. It should be noted in this context that the angle $\alpha$ in FIG. 2 is greater than the values shown above because at the stage shown the strut 47 is not yet in a fully expanded position.

When the repair at the downstream section 11 is done, is necessary to move the plug downstream, with the flow of liquid in the pipeline 16, to remove the from the pipeline. This requires the release of the moving struts 47 from their locking position.

The release is effected by shearing off the shear pin 42. This is effected by increasing the pressure in the pipeline at the upstream or rear end 10 of the plug. The raised pressure opens the safety non-return valve $V_s$ shown diagrammatically only in FIG. 2, increasing the pressure in the cylinder chamber 66 which then urges the piston 38 to the right of FIG. 2. Eventually, the pressure of the fluid acting on the piston 38 and thus on the piston rod 40 shears off the shear pin 42.

With the shear pin 42 sheared off, the boss 43 and thus the seat 44 is free to move to the left of FIG. 2, with the entire inner body, including the cylinder 31. The movement is caused by an axial vector generated by the pressure at which the pivot head 46 of each moving strut is urged radially inwardly, while being in contact with the seat 44. Eventually, the resilient ring (not shown), passing through the centers 60 of the pivot heads 46 brings the struts 47 radially inwardly as best seen in FIG. 3. The displacement of the inner body also results in disengagement of the cone 61 from the conical surface 63.

Consequently, the entire plug is now disengaged from the pipe 16 and can be moved along the pipe 16 using regular flow of fluid and removed at an appropriate ramp or the like. Then the plug is reset by replacing the shear pin 42 and generally bringing the plug to the condition indicated in FIG. 1.

Figure 4:
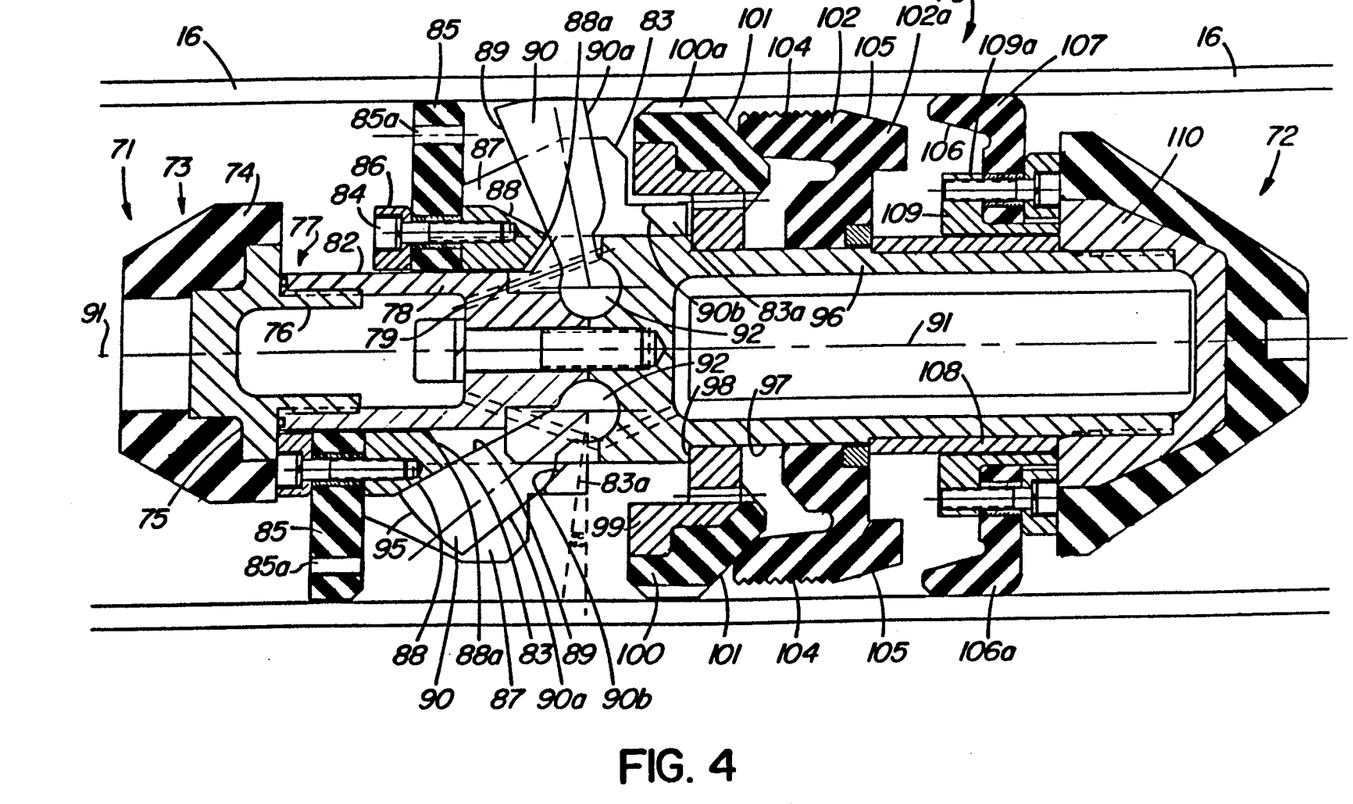
FIG. 4 is a diagrammatic cross-sectional representation of a downstream plug of the present invention showing, in its lower half, mutual position of the parts of the plug during the inserting of the plug into and propelling of same through a pipeline section to be repaired, while the upper half of the view shows a first stage of the operation of the locking of the plug in place.
Figure 5:
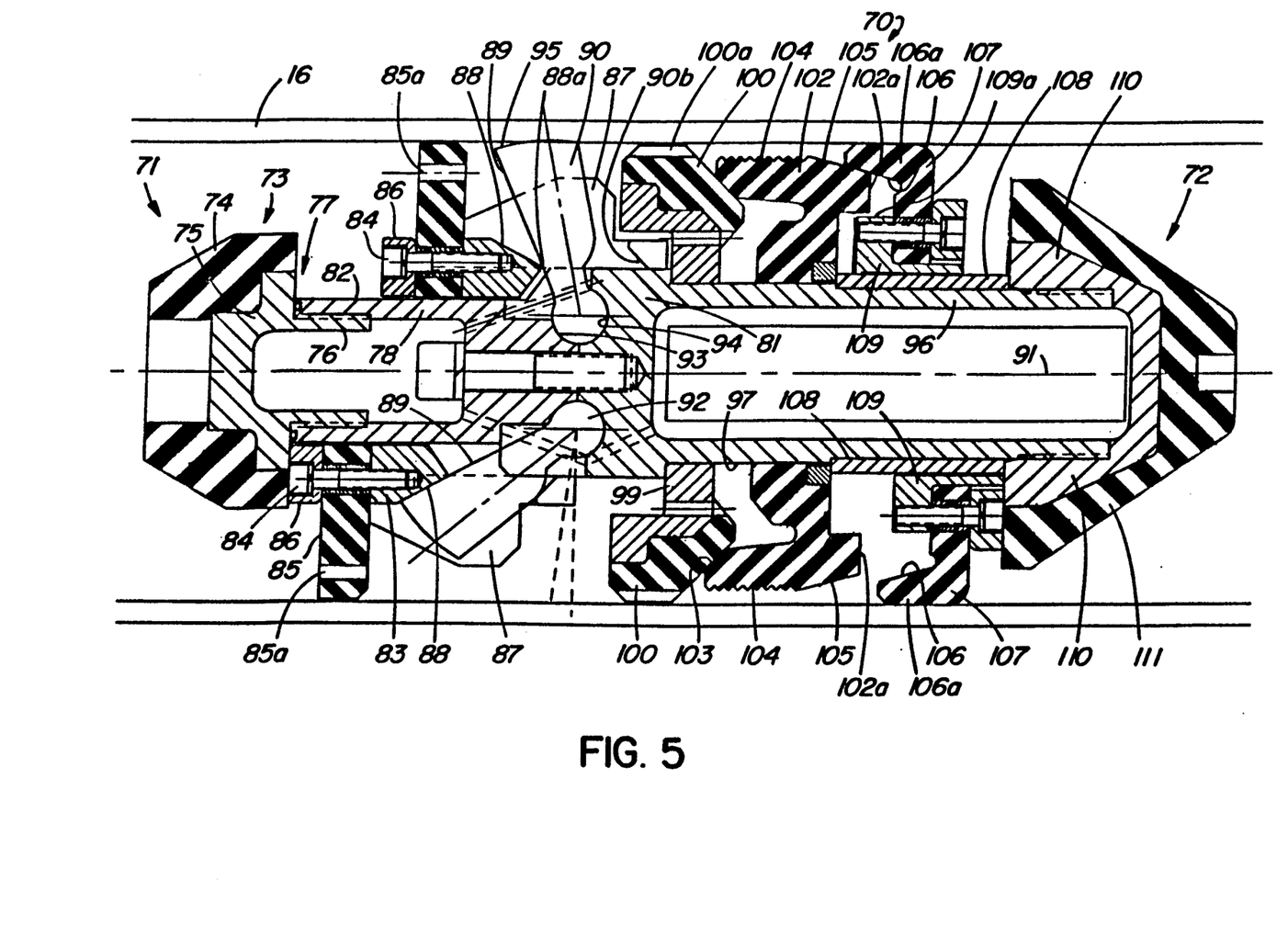
FIG. 5 is a cross-sectional representation similar to FIG. 4 but showing, in the upper half, the mutual position of the parts of the plug during a second stage of the operation of the locking of the plug in place, the lower half corresponding to that of FIG. 4.
Figure 6:
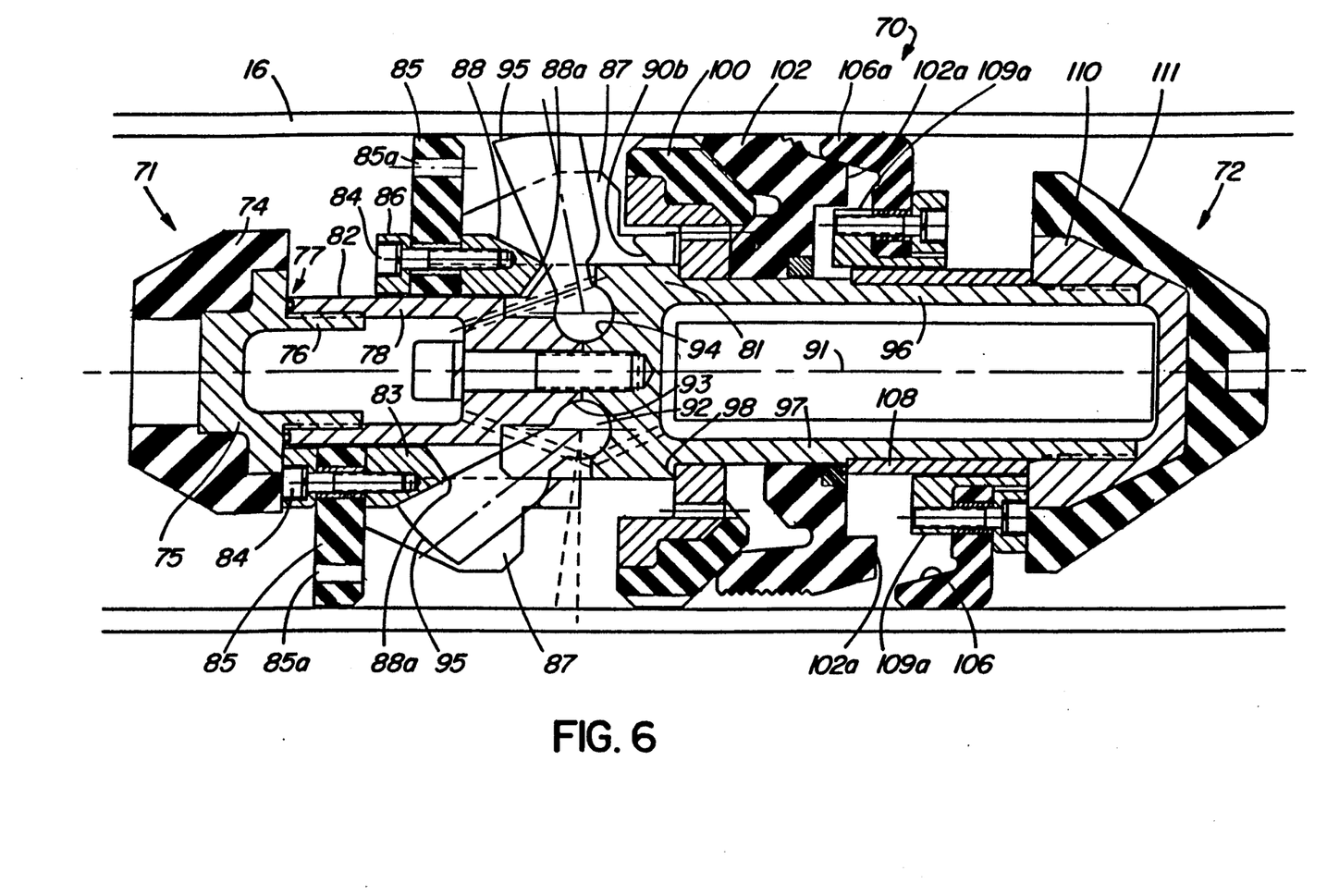
FIG. 6 is a cross-sectional representation similar to FIG. 4 but showing, in the upper half, the mutual position of the parts of the plug in a third, fully locked stage of the plug in place, the lower half corresponding to that of FIG. 4.

Referring now to the representation of FIGS. 4–6, a second embodiment of a plug of the present invention is shown which differs from the first in that the second plug 70 is a downstream plug to be disposed, from the standpoint of regular flow of the respective medium through the pipeline, at a downstream end of a pipeline section to be repaired. Also, the second embodiment of the plug of FIGS. 4–6 has drag inducing means of a different type from that of the first embodiment, as will be apparent from the following description.

Viewed from the standpoint of the flow of a fluid such as natural gas or oil through the pipeline 16 the plug 70 has an upstream end 71 and a downstream end 72. Since the plug 70, like the first mentioned upstream plug of FIGS. 1-3, is brought to its desired location by a flow having the direction of a regular flow through the pipeline 16, i.e. from the left to the right, the upstream and downstream ends 71 and 72 may also be referred to as a "rear" end 71 and a "front" end 72, respectively.

The rear end 71 includes a rear bumper 73 made of an elastomeric, preferably polyurethane surface portion 74 and a steel core 75. The core 75 has a threaded stem portion 76 threaded inside a tubular upstream end 77 of a rear body 78 of the plug. A bolt 80 secures the rear body 78 to a main body 81.

The outer, cylindric surface 82 of the upstream end 77 of the rear body 78 slidably carries a ring-shaped guide 83 to which is fixedly secured, by a number of bolts 84, a rear pig 85. The pig 85 is provided with a plurality of axially directed passages 85a. The rear pig 85 is pressed to the rear axial face of the ring 83 by a pressure ring 86 engaged by the bolts 84. The extreme forward end of the guide 83 forms four gripper housing slots 87. Each slot defines an oblique surface 88 terminating, at the forward end thereof, at an angled tip 88a. The rear pig 85 presents, in general terms, another embodiment of a drag inducing device. It has a fit in the pipeline 16 which is sufficient for developing a drag force vector when the plug 70 is moved along the pipeline but it does not entirely prevent such movement. This arrangement is referred to hereafter as a "drag fit"; it will be described later in greater detail.

The oblique surface 88 of the guide 83 is in coincidence with a rear surface 89 of a respective gripper 90, when the latter is disengaged. The disengaged state is shown in the lower halves of the views of FIGS. 4, 5 and 6. They show that the front surface 90a is engaged by a second inclined surface 90b of the front portion 83a of the guide 83. In the embodiment shown, there are four grippers 90, one in each slot 87, uniformly disposed about the axis 91 of the plug 70. It is to be understood, of course, that the number and overall disposition of the grippers is entirely optional. One end of each gripper 90 forms a pivot head 92 received in complementary seats 93, 94 provided in the facing end portions of the rear body 78 and of the main body 81. The opposite end of each gripper 90 forms a gripping surface 95 which is provided with suitable roughening such as serration or the like, to provide a firm hold on the inside of the pipeline 16, when the grippers 90 are engaged with the pipeline 16 (top half of FIGS. 4–6).

The main body 81 has a front portion 96 of a tubular configuration, with a cylindric surface 97. The rear end of the cylindric surface 97 terminates at a shoulder 98. Fixedly secured to the cylindric surface 97 is an expansion cone comprised of an annular core 99 and a conical ring 100 which has a plurality of axial passages 100a disposed about its periphery such that each passage 100a is partly defined by the inside wall of the pipeline 16. The conical ring 100 has a conical expansion surface 101.

A main seal 102 having an axially forwardly projecting annular extension 102a of wedge-shaped cross-section, is slidably mounted on the cylindric surface 97. It has a conical rear abutment surface 103 which abuts against the expansion surface. The main seal has a sealing surface portion 104 which is spaced from the inside wall of the pipeline 16 when the main seal 102 is in a relieved state shown in FIGS. 4 and 5. At its front end, the main seal has an outer conical surface 105.

The outer conical surface 105 is complementary with an inner conical surface 106 of a rearward turned lip 106a cup-shaped front carrying seal 107 which is slidably supported by a sleeve 108. The carrying seal 107 is disposed over an annular core 109 which slides over the sleeve 108. The annular core 109 thus forms a part of the carrying seal. It defines an outer cylindric surface 109a which combines with the conical surface 106 to form an axially rearwardly open annular cavity in the carrying seal 107 complementary with the projection 102a of the main seal 102.

The forwardmost end of the front part 96 of the main body 81 is provided with a threaded cap 110 the outer surface of which is covered with urethane layer to provide a front or downstream end bumper 111.

To summarize: the rear pig 85 is slidable relative to the main body 81. The grippers are pivotable in the angular sense indicated in the drawings. The conical ring or expansion cone 100 is stationary relative to the body 81. The main seal 102 slides relative to the main body 81 and the same applies to the front carrier seal.

In operation, the plug 70 is brought to the desired location by the medium flowing in the pipeline 16 in its regular direction, i.e. from the left to the right of FIGS. 4–6. This stage of the plug is shown in the lower halves of each of FIGS. 4–6. The fluid of the pipeline 16 flows through the passages 85a and 100a, over the annular space between the sealing surface portion 104 and the inner wall of pipe 16, to the rearward turned lip 106a of the front carrier seal 107. The pressure differential caused by the flow propels the seal 70 to the right of FIG. 4.

The dragging effect of the rear pig 85 keeps the pig 85 to the left extreme position. The pressure of the flowing fluid, however, overcomes the dragging effect and moves the entire assembly to the right of FIG. 4.

Eventually, the plug 70 reaches its desired position inside the pipeline. This is established by a known electronic tracker (not shown in the drawings) mounted in the plug an emitting an electric signal which enables the operator to determine its location from the outside of the pipeline.

At this point, the flow of the medium in the pipe 16 is stopped by a not shown valve upstream of the plug 70. By reversing the pressure in the pipeline 16, for instance, by evacuating the fluid from the space of pipe 16 to the left of plug 70, a force vector is developed which will tend to propel the plug 70 to the left of FIG. 4 despite the fact that some leakage of the pressurized medium will leak through the front carrier seal 107. As a result, the plug 70 will move towards the left of FIG. 4. The dragging effect of the rear pig 85 will shift the pig 85 along the cylindric surface 82 to the right, as shown in the top half of FIG. 4. Since the rear pig is, in effect, integral with the guide 83, the displacement of the pig 85 relative to the rear body 78 results in the spreading of the grippers 90 to an expanded position.

The grippers 90 eventually engage, with their gripping surfaces 95, the inside wall of the pipe 16 arresting, by virtue of a strong engagement caused by a close to-the-centre position of the grippers, any further motion of the plug to the left of FIG. 4. The state at the point of strong engagement of the moving strut grippers is diagrammatically shown in the top half of FIG. 4.

Continued pressure at the right-hand end of the plug 70 now acts against a stationary plug. As a result, the front carrier seal 107 is displaced. It slides along the sleeve 108 to the left of FIG. 4 to reach the position of the top half of FIG. 5. At this point, the inner conical surface 106 engages the outer conical surface 105 of the main seal 102. This generates a radially outward pressure vector at the lip 106a resulting in a thorough sealing of the front carrier seal 107 with respect to the pipe 16. The pressure active at the right hand end of the plug of FIG. 5 is now active over the entire cross-section of the pipeline resulting in an increase of the force vector directed to the left, at the front carrier seal.

The front carrier seal 107 eventually squeezes the front annular projection 102a between the inner conical surface 106 and the cylindric surface with the result that the main seal 102 is now forcefully urged to move, along with the front carrier seal 107, to the left of FIG. 5. Eventually, the pressure from the right hand end of FIG. 6 causes the sealing deformation of the main seal 102 thus effectively plugging the pipeline 16 at a downstream end of a section of pipeline 16 to be worked upon.

The space to the left of the plug now in full operative position, may be evacuated of the medium or, if desired, the upstream plug described with reference to FIGS. 1-3 may be installed to provide a strong plugging at each end of the section to be repaired or replaced.

The plug is released from its operative position by re-applying pressure in the pipeline at the rear end of the plug possibly combined with evacuating the pipeline space ahead of the plug. The pressurized medium reaches, via passages 85a and 100a the carrier seal 107, resulting in displacement of the seal 107 to the right, release of the main seal 102 and displacement of the entire pig to the right of FIGS. 4-6, resulting in release of the gripping struts 90 and, eventually, displacement of the pig 85 to the rear of the plug to hold the loose struts 90 in retracted position. The pressure of the flow in the pipeline then propels the plug to a downstream located plug trap (not shown) as is well known in the art.

A typical application of the upstream and downstream plugs described will be summarized with reference to FIG. 7. The diagram of FIG. 7 shows the pipeline 16 having an intermediate space 16a in which a repair, e.g. replacement of a pipe section, is to be carried out. $V_u$ is an upstream valve operative to open or close the pipeline 16 for a fluid flow in the direction shown. $V_d$ is a downstream valve of the pipeline 16. $P_u$ is an upstream plug such as disclosed with reference to FIGS. 1-3 and $P_d$ is a downstream plug such as the one shown in FIGS. 4-6, it being understood that the circular figures at the trailing ends of both plugs are mere diagrammatic representations of the drag inducing members.

In the stage (A), both valves $V_u$ and $V_d$ are open to cause the fluid in the pipeline 16 flow. The flow brings the two plugs $P_u$, $P_d$ to the desired location relative to the section 16a. In the following stage (B), the valve $V_d$ is closed and the space 16a evacuated to generate pressure differential at the front (right-side) end of $P_d$, triggering the locking and sealing operation of the plug of FIGS. 4-6.

When the plug $P_d$ is in place, fluid is injected into section 16a, at pressure sufficient to move plug $P_u$ to the left (C) but not strong enough to release $P_d$. As a result, $P_u$ (shown in detail in FIGS. 4-6) is now locked and sealed in place. As shown in (D), both valves $V_u$ and $V_d$ are now closed and the seals $P_u$, $P_d$ sealingly separate space 16a from the rest of the pipeline.

In Figure (E), the plugs are locked in place and fluid removed from section 16a, rendering same ready for maintenance work (F) such as replacement of a pipeline section, fixing of a leak or the like. During the maintenance work, the valve $V_d$ is open as shown.

When the maintenance work is finished (G), valve $V_u$ is opened developing pressure differential at the rear of $P_u$ releasing the locking and sealing of the plug as described and shown in FIGS. 1-3 and, subsequently, releasing the plug $P_d$. Both plugs can now be propelled by the fluid in the pipeline to a pig trap (not shown) disposed downstream of the pipeline 16.

It can be seen from the above, that the entire operation of the plugs is controlled by controlling pressure differential in the pipeline being maintained, without any additional power source to operate the plugs.

Those skilled in the art will readily appreciate that a number of modifications is possible to the plug which would differ, to a greater or lesser degree, from the embodiments shown, as an example, the drag inducing means and the associated transmission device can be of many other types and would achieve the same basic effect, namely the initial displacement of the toggle-type grippers into engagement with the pipeline wall to initiate the locking operation.

Accordingly, I wish to protect by letters patent that may issue on this application, all such embodiments as fairly fall within the scope of my contribution to the art.

I claim:

1. A pipeline plug for use in temporarily plugging a section of a pipeline, said plug comprising, in combination:

(a) an elongated body having a front end and a rear end;

(b) front guide device and a rear guide device disposed one near each the front and rear end, respectively, for guiding the plug through a pipeline as the plug is propelled, the front end first, by fluid pressure generated by a medium flowing through the respective pipeline;

(c) a radially expandable elastomeric sealing device provided with a seal expanding mechanism, to expand the sealing device to thus plug the respective pipeline;

(d) a radially expandable locking mechanism adapted to engage, upon expansion, the inside wall of the respective pipeline to lock the body against movement relative to the pipeline;

(e) lock actuation member freely reciprocally movable along the body from a first position to a second position;

(f) said lock actuation member including a drag device comprising a friction inducing section and engagement device adapted to urge said friction inducing section in contact with the inside wall of the respective pipeline;

(g) transmission mechanism operatively disposed between the friction inducing section and the locking mechanism to cause expansion of the locking mechanism when the plug is subjected to a reversed flow of the fluid in the pipeline, directed against the front end of the body.

2. A pipeline plug as claimed in claim 1, wherein said locking mechanism includes a plurality of moving struts one end portion of each strut being pivotable relative to said body about a pivot having a pivot axis generally transverse to elongation of said body, each strut being provided, at the other end thereof with a locking foot adapted to lockingly engage inside wall of the respective pipeline to prevent displacement of the body along the respective pipeline.

3. A pipeline plug as claimed in claim 2, wherein each moving strut includes an intermediate portion passing through a passage provided in a generally annular guide, said guide and said pivots being movable relative to each other longitudinally of the body; whereby, at one extreme mutual position of the guide and the pivots, the moving struts are retracted and, in the other, expanded into contact with the wall of the respective pipeline.

4. A pipeline plug as claimed in claim 3, wherein the guide is movable along the body to expand the struts.

5. A pipeline plug as claimed in claim 4, including motion transmitting device operatively connected, at one end thereof, to said lock actuation member and, at the other, to said guide, to expand the struts in response to displacement of the lock actuating member relative to the body upon reversal of pressure in the respective pipeline.

6. A pipeline plug as claimed in claim 5, wherein the length of the moving struts is such as to secure, in an expanded position, a before-the-centre inclination of a longitudinal axis of the struts relative to elongation of the body at an angle of about 3° to about 10°.

7. A pipeline plug as claimed in claim 6, wherein the struts are so disposed and arranged that they are convergent in a forward direction of the body when in expanded or expanding position, whereby the plug is an upstream plug.

8. A pipeline plug as claimed in claim 6, wherein the struts are so disposed and arranged that they are convergent in a rearward direction of the body when in expanded or expanding position, whereby the plug is a downstream plug.

9. A pipeline plug as claimed in claim 1, wherein said friction inducing section is a periphery of a plurality of guide rollers rotatable each about an axis of rotation transverse to the direction of elongation of the body, said rollers being adapted to freely rotate in a direction corresponding to a forward motion of the body, and to be blocked from rotation in a direction corresponding to a rearward motion of the body.

10. A pipeline plug as claimed in claim 1, wherein said friction inducing section is a periphery of a ring-shaped rear pig of the plug fixedly secured to the lock actuation member, the diameter of the periphery being selected to induce a dragging effect which is in excess of the force required to slide the lock actuation member along the body, but is below the force required for preventing the motion of the body caused by the fluid pressure generated by the flow of a medium in the pipeline, whereby the flow is capable of moving the entire plug along the pipeline despite the dragging effect.

11. A pipeline plug as claimed in claim 2, wherein said one end of each strut is located in a concave seat formed of two complementary half-seats, said plug comprising seat release mechanism responsive to a predetermined pressure in the respective pipeline, said seat release mechanism being adapted to separate the half-seats from each other to release said one end of the strut and thus the engagement of the locking foot with the inside wall of the pipeline.

12. A pipeline plug for use in temporarily plugging a section of a pipeline, said plug comprising, in combination:

(a) an elongated body having a front end and a rear end;

(b) front guide device and a rear guide device disposed one near each the front and rear end, respectively, for guiding the plug through a pipeline as the plug is propelled, the front end first, by fluid flowing through the pipeline;

(c) a radially expandable locking mechanism adapted to engage, upon expansion, the inside wall of the respective pipeline to lock the body against movement relative to the pipeline;

(d) a radially expandable elastomeric main seal provided with a seal expanding mechanism, to expand the main seal to thus plug the respective pipeline;

(e) said seal expanding mechanism including a seal expansion cone mounted on said body coaxially with the main seal;

(f) said seal expansion cone and said main seal being axially displaceable relative to each other and being complementary with each other to provide for expansion of said main seal when engaged under pressure with the cone;

(g) pressure transmitting device operatively associated with the main seal and with the cone to use fluid pressure prevailing in the respective pipeline and acting against one end of the body, to urge said main seal and said cone to each other to thus expand said main seal, whereby the power of expansion of said main seal is derived from pressure inside the pipeline and acting against the plug.

13. A pipeline plug as claimed in claim 12, wherein the front guide device is an elastomeric carrying seal defining an axially rearward directed peripheral sealing lip which has an inside conical surface complementary with an outer conical surface of the main seal, the carrying seal being axially displaceable toward the main seal to sealingly engage same at said conical surface.

14. A pipeline plug as claimed in claim 13, wherein the main seal and the carrying seal are both slidably displaceable on the body toward a conical surface of said expansion cone.

15. A pipeline plug as claimed in claim 14, wherein the outer conical surface of the main seal is an outer periphery of an axially forwardly projecting annular extension of the main seal, said extension having a wedge-shaped cross-section which is compatible with an axially rearwardly open annular cavity in the carrying seal.

* * * * *